Patented Oct. 6, 1925.

1,556,174

UNITED STATES PATENT OFFICE.

WALTER JAMES STEVENSON, DECEASED, LATE OF LONDON, ENGLAND; BY MAY LUCIE STEVENSON, ADMINISTRATRIX, OF PINNER, ENGLAND, ASSIGNOR TO ARTSILK LIMITED, OF LONDON, ENGLAND, A CORPORATION OF GREAT BRITAIN.

PURIFICATION OF VISCOSE SOLUTIONS.

No Drawing. Application filed May 19, 1925. Serial No. 31,405.

*To all whom it may concern:*

Be it known that WALTER JAMES STEVENSON, late a subject of the King of Great Britain and Ireland, but now deceased, and a resident of London, England, did during his lifetime invent a certain new and useful Improvement in the Purification of Viscose Solutions (for which he has obtained a patent in Great Britain, No. 225,135, filed the 24th day of May, 1924), of which the following is a specification.

This invention relates to the manufacture of artificial silk from viscose, wherein purified wood pulp or the like is converted into alkali-cellulose pulp and treated to form viscose which is squirted into a coagulating bath such as an acid sodium bisulphate solution.

For the purpose of this invention, a solution of viscose produced from a high grade wood pulp or from bleached cotton is first submitted to a centrifugal treatment, whereby the force of gravity is increased to five or six thousand times natural gravity, for the separation or removal of suspended undissolved solids in bulk; secondly, to filtration through presses containing powdered charcoal as the filtering medium. A cellulose solution of great clearness and purity is thus obtained which passes freely through the spinning orifices without causing trouble.

The centrifugal treatment and filtering are applied to the alkali viscose solution obtained by treating the cellulose with caustic soda to form alkali-cellulose pulp which is then treated with carbon bisulphide and the resulting viscose mass dissolved in caustic soda solution. This alkali-viscose solution is submitted to the centrifugal treatment and filtered through charcoal or a combination of charcoal and sand. In filtering the alkali solution of viscose, especially when sand is included in the filtering medium, the solution is preferably cooled to 3°–0° C. previously to filtering.

By this cooling process the degradation of the cellulose is lessened. By the method described the cellulose completely loses its fibrous nature and is converted into a clear colloidal solution which, on treatment in any known manner with acids, solutions of salts of both in the precipitating bath, produces filaments or threads of a high degree of purity which can be spun directly and are easily bleached.

I claim:—

1. In the manufacture of artificial silk from viscose, the purification of the viscose solution prior to its formation into filaments in the precipitating bath, by submitting it to a centrifugal separating treatment, and then passing the centrifuged solution through filter presses containing powdered charcoal.

2. In the manufacture of artificial silk from viscose according to claim 1, the employment of filter presses wherein the filtering medium is a mixture of fine sand and powdered charcoal.

In testimony whereof I have affixed my signature hereto this 8th day of May 1925.

MAY LUCIE STEVENSON,
*Administratrix of the Estate of Walter James Stevenson, deceased.*